United States Patent
Behere et al.

(10) Patent No.: US 9,672,060 B2
(45) Date of Patent: Jun. 6, 2017

(54) MANAGING VIRTUAL MACHINE MIGRATION

(71) Applicant: NETAPP, INC., Sunnyvale, CA (US)

(72) Inventors: Shweta Behere, Sunnyvale, CA (US); Sung Ryu, Sunnyvale, CA (US); Joshua Flank, Sunnyvale, CA (US); Pradeep Thirunavukkarasu, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/814,828

(22) Filed: Jul. 31, 2015

(65) Prior Publication Data
US 2016/0335106 A1 Nov. 17, 2016

Related U.S. Application Data

(60) Provisional application No. 62/161,802, filed on May 14, 2015.

(51) Int. Cl.
*G06F 9/455* (2006.01)

(52) U.S. Cl.
CPC ...... *G06F 9/45558* (2013.01); *G06F 9/45512* (2013.01); *G06F 2009/4557* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 5,710,917 A | 1/1998 | Musa et al. |
| 8,386,838 B1 * | 2/2013 | Byan .................. G06F 11/1484 714/5.11 |
| 2008/0235238 A1 * | 9/2008 | Jalobeanu ............ G06Q 10/107 |
| 2010/0070725 A1 | 3/2010 | Prahlad et al. |

(Continued)

OTHER PUBLICATIONS

John, J., "Top Three Things to Know Before you Migrate to Clustered Data ONTAP", Datalink-Blog, Jul. 23, 2013, 5 pages.

*Primary Examiner* — Emerson Puente
*Assistant Examiner* — Jonathan R Labud
(74) *Attorney, Agent, or Firm* — Gilliam IP PLLC

(57) ABSTRACT

Exemplary embodiments provide techniques for managing VM migrations that use relatively simple and uncomplicated commands or APIs that can be executed through scripts or applications. Configuration and preparation for the conversion may be addressed by one set of command-lets or APIs, while the conversion itself is handled by a separate set of command-lets or APIs, which allows the conversion command-lets to be uncomplex and to require little input. Moreover, the architecture-specific commands can be largely abstracted away, so that the configuration and conversion processes can be carried out through straightforward general commands, which automatically cause an interface (e.g., at the conversion server) to call upon any necessary architecture-specific functionality. Still further, the information that must be entered by a user may be kept to a minimum, because the initial configuration information may be used by the system to automatically discover additional information that is needed to perform the conversion.

20 Claims, 6 Drawing Sheets

(56) References Cited

U.S. PATENT DOCUMENTS

| | | | |
|---|---|---|---|
| 2011/0131524 A1* | 6/2011 | Chang | G06F 9/4443 715/780 |
| 2013/0024722 A1 | 1/2013 | Kotagiri et al. | |
| 2013/0139155 A1* | 5/2013 | Shah | G06F 9/45558 718/1 |
| 2013/0343385 A1 | 12/2013 | Benny et al. | |
| 2014/0149983 A1 | 5/2014 | Bonilla et al. | |
| 2015/0140974 A1* | 5/2015 | Liimatainen | G06T 17/00 455/414.1 |
| 2015/0324216 A1 | 11/2015 | Sizemore et al. | |
| 2015/0324217 A1 | 11/2015 | Shilmover et al. | |

\* cited by examiner

MANAGING VIRTUAL MACHINE MIGRATION

RELATED DOCUMENTS

This application claims priority to U.S. Patent Application Ser. No. 62/161,802, filed on May 14, 2015 and entitled "Techniques to Manage Data Migration." The contents of the aforementioned application are incorporated herein by reference.

BACKGROUND

A virtual machine (VM) is a software implementation of a machine, such as a computer, that executes programs like a physical machine. A VM allows multiple operating systems to co-exist on a same hardware platform in strong isolation from each other, utilize different instruction set architectures, and facilitate high-availability and disaster recovery operations.

In some situations, it may be desirable to change from one type of VM architecture to another. Typically, this requires that the information in the current (source) VM be copied into the new (destination) VM. Migrating data between VM architectures, however, may be problematic. For instance, migration may be a complex process that must be overseen by a skilled administrator familiar with the architecture-specific commands that must be executed on the source VM and destination VM in order to effect the migration. As a result, migration may cause a disruption in services, lengthy migration times, or in some cases lead to data corruption.

SUMMARY

Exemplary embodiments provide techniques for managing VM migrations that use relatively simple and uncomplicated commands that can be executed through scripts or applications. Configuration and preparation for the conversion may be addressed by one set of command-lets, while the conversion itself is handled by a separate set of command-lets, which allows the conversion command-lets to be uncomplex and to require little input. As a result, user error can be reduced. Moreover, the architecture-specific commands can be largely abstracted away, so that the configuration and conversion processes can be carried out through straightforward general commands, which automatically cause an interface (e.g., at the server handling the conversion) to call upon any necessary architecture-specific functionality. Thus, the user need not know all the details of various kinds of hypervisors.

Still further, the information that must be entered by a user (e.g., an administrator) may be kept to a minimum, because the initial configuration information may be used by the system to automatically discover additional information that is needed to perform the conversion.

According to exemplary embodiments, methods, mediums, and systems are provided for managing the conversion of a VM from a first type (exemplified by a particular type of hypervisor architecture) to a second type (exemplified by a different type of hypervisor architecture).

Exemplary embodiments may involve executing a script using a processor. The script may include a command-let.

The script may include commands for converting a virtual machine from a first type of hypervisor to a second type of hypervisor distinct from the first type. Regardless of a type of hypervisor associated with the virtual machine, the virtual machine may be hosted in a Data ONTAP storage virtual machine.

The script may call a command through an interface on a conversion server. The interface may be hypervisor-independent. The interface may be reusable to implement a new type of VM conversion. In some embodiments, the interface may be an API such as a RESTful API, and the configuration commands may be organized into a set of commands in the RESTful API. According to some embodiments, there may be a 1:1 correspondence between the commands in the script and commands accessible through the interface. The API may be expandable.

In some embodiments, the interface may separate configuration functionality from conversion functionality. Inputs to the conversion functionality may be limited to a VM name and a direction of conversion. The command called by the script may be a dedicated convert command.

In response to the command, the conversion server may convert the virtual machine from the first type of hypervisor to the second type of hypervisor.

In some embodiments, basic information provided to the set of commands in the RESTful API may be used to discover more detailed configuration information about the virtual machine or a guest operating system running on the virtual machine.

Unless otherwise noted, it is envisioned that any of the above-described or below-described functionality may be implemented in any combination. Although specific embodiments are described for purposes of illustration, those embodiments are not intended to be exclusive.

DETAILED DESCRIPTION

Exemplary embodiments relate to techniques for initiating and managing a migration of a virtual machine ("VM") from one type to another. According to some embodiments, migration is initiated and managed through a set of command-lets ("cmdlets") that call upon functionality accessible through an interface, such an application programming interface ("API"). There may be a one-to-one correspondence between the cmdlets and functions of the interface. Therefore, the cmdlets may be called through applications or scripts, which allows for an adaptable and simple conversion process that can be initiated from a wide variety of applications.

Moreover, functionality for configuring the VMs and the environment in which the VMs operate (e.g., a network, servers, data stores, etc.) may be maintained separately from functionality for converting between types of VMs. Accordingly, the commands used to convert between the VMs can be uncomplicated and easily-implemented.

Figure 1:
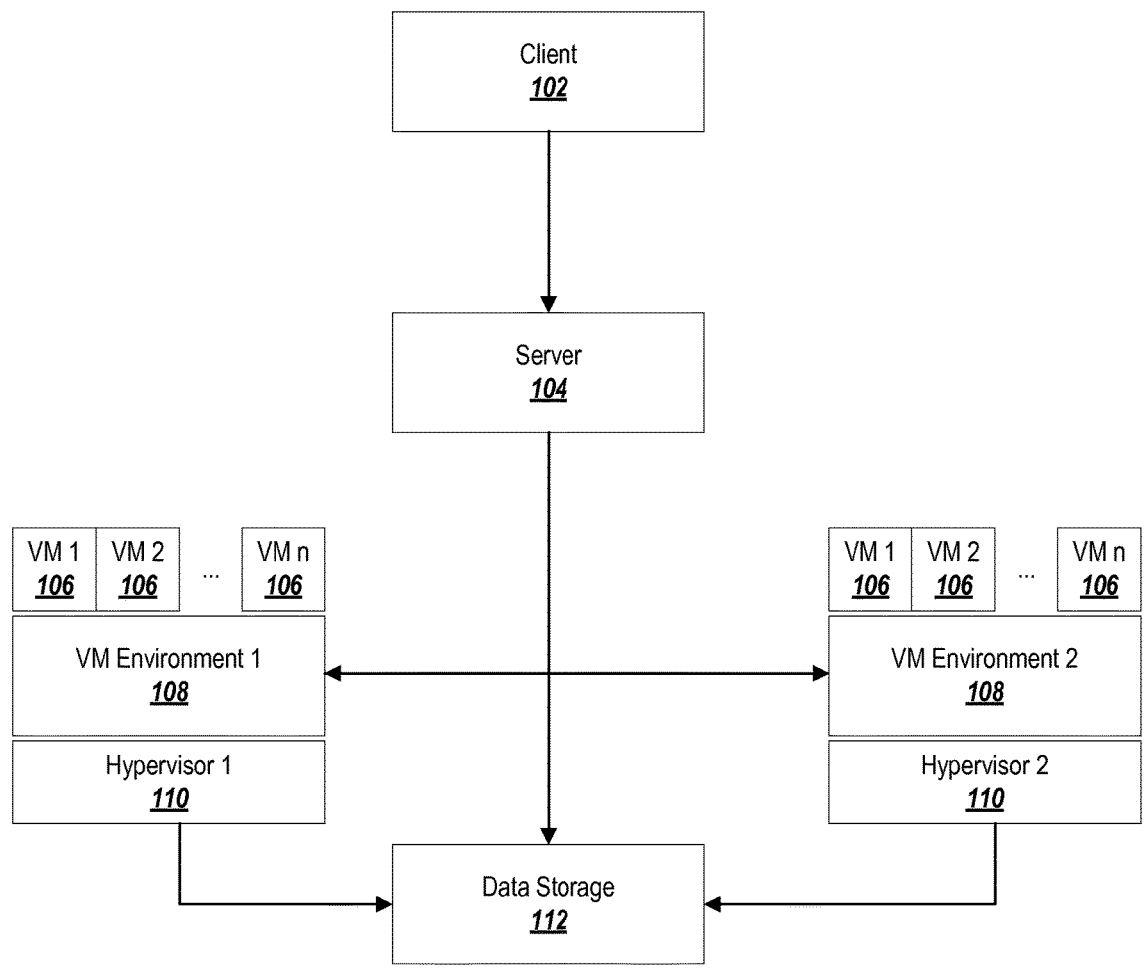
FIG. 1 depicts an exemplary environment suitable for use with embodiments described herein.

With reference to FIG. 1, a client 102 may be provided with access to one or more VMs through a server 104. Typically, a guest operating system (OS) runs in a VM 106 on top of an execution environment platform 108, which abstracts a hardware platform from the perspective of the guest OS. The abstraction of the hardware platform, the providing of the virtual machine, is performed by a hypervisor 110, also known as a virtual machine monitor, which runs as a piece of software on a host OS. The host OS typically runs on an actual hardware platform, though multiple tiers of abstraction may be possible. While the actions of the guest OS are performed using the actual hardware platform, access to this platform is mediated by the hypervisor 110.

For instance, virtual network interfaces may be presented to the guest OS that present the actual network interfaces of the base hardware platform through an intermediary software layer. The processes of the guest OS and its guest applications may execute their code directly on the processors of the base hardware platform, but under the management of the hypervisor.

Data used by the VMs 106 may be stored in a data storage system 112. The data storage system 112 may be on the same local hardware as the VMs 106, or may be remote from the VMs 106. The hypervisor 110 may manage the storage and retrieval of data from the data storage system 112 on behalf of the VMs 106. Each type of hypervisor 110 may store and retrieve data using a hypervisor-specific style or format.

Multiple vendors provide hypervisors 110 for the execution of virtual machines 106 using abstraction technology unique to the vendor's implementation. The vendors use technology selected according to their own development process. However this technology is frequently different from vendor to vendor. Consequently, the guest OS has tailored virtual hardware and drivers to support the vendor implementation. This variation may lead to a core incompatibility between VM platforms. For example, different VM platforms may use different technologies for bridging to a network, where virtualized network interfaces are presented to the guest OS. Similarly, different VM platforms may use different formats for arranging the data stored in virtual disks onto actual storage hardware.

In some circumstances, an administrator may wish to migrate existing VMs 106 running under the management of one type of hypervisor 110 to management by a different type of hypervisor 110. However, given the proprietary nature of hypervisor technology, VM migration may be very complex. For example, migrating a guest OS from one VM platform to another may require reconfiguration of the guest OS and modification of files stored on the host OS that are referenced by the hypervisor 110.

As used herein, migration refers to moving a virtual machine 106 from a source to a destination. In a migration operation, the virtual hardware entities associated with the virtual machine 106 (including the virtualized CPU, network card, memory, peripherals such as a DVD player, etc.) are recreated at the destination hypervisor 110. Migration can be a complicated operation, in which the sequence of operations can be important in order to provide reliable and accurate conversion of the data.

Traditionally, in order to migrate from one hypervisor 110 to another, an administrator may issue a complicated series of commands that reconfigures and converts a source VM into a destination VM. This may involve issuing commands to copy data from the source VM to the destination VM, which takes a significant amount of time (hours to days). This is typically a manual process requiring a great deal of knowledge of both the source VM platform and the destination VM platform and the associated commands that are used to reconfigure and convert each type of VM.

The exemplary embodiments described herein simplify the migration process. An exemplary migration process according to embodiments of the present invention is described below with reference to FIGS. 2-6.

Figure 2:
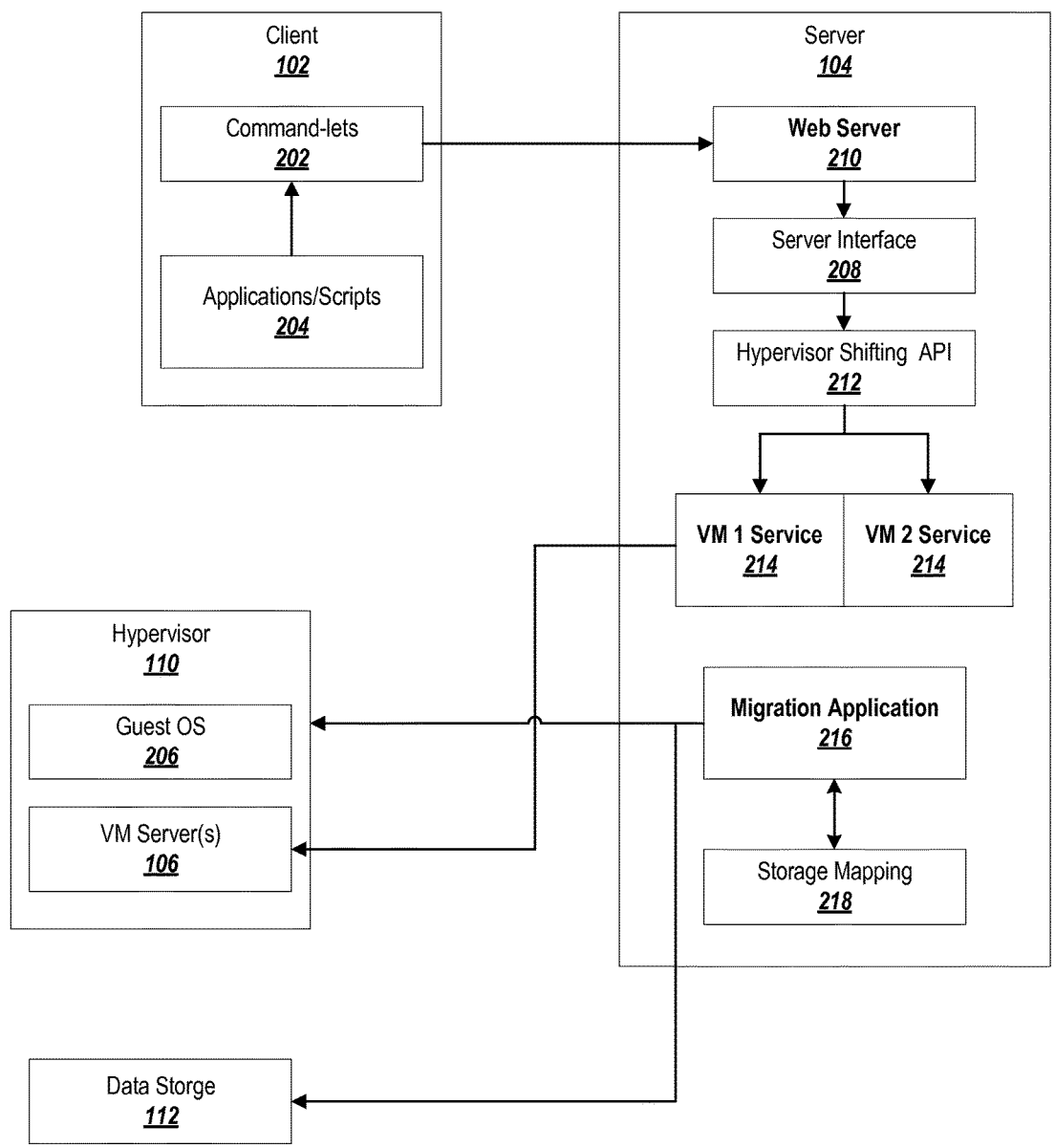
FIG. 2 depicts exemplary interactions between components of exemplary embodiments.

As shown in FIG. 2, a virtual machine migration system 200 may include a client 102, a migration server 104, and one or more hypervisors 110 and/or storage resources 112.

The client 102 may be a computing device through which a user or logic is able to execute commands (e.g., in the form of cmdlets 202, such as PowerShell cmdlets). The commands may be executed from an application or script 204.

The client 102 may initiate the migration of a guest OS 206 from a source VM managed by a source hypervisor to a destination VM managed by a destination hypervisor. Data associated with the source VM and/or the destination VM may be stored in data storage 112 managed by a storage virtual machine (SVM), such as an SVM provided by a Data ONTAP cluster of NetApp, Inc. of Sunnyvale, Calif.

The migration may be carried out by issuing the commands to a migration server 104, which performs the migration. The migration recreates the virtual hardware entities associated with the virtual machine at the destination hypervisor. In performing the migration operation, only a source disk image is copied to the destination; the hardware setup is reconfigured to exist at the destination in the same configuration as at the source.

The migration server exposes an interface 208, such as a RESTful API. The interface 208 allows the client 102 to execute interface commands (e.g., methods or functions), which may have a one-to-one correspondence to commands available through the cmdlets 202. In some embodiments, the client 102 interacts directly with the interface 208 (e.g., by having a user issue commands to the interface 208 using the cmdlets 202 directly); however, as described in more detail below there may be advantages to interacting with the interface 208 indirectly through scripts 204 that call the cmdlets 202.

The interface 208 abstracts away many of the operations required to perform the migration. This allows the commands sent to the interface 208 to be relatively simple (e.g., a "convert" command that specifies only a VM name and a direction from a source VM type to a destination VM type). Commands issued to the interface 208 may be handled by a web server 210, such as the depicted Apache Tomcat servlet.

The commands issued to the interface 208 may then be sent to a Hypervisor Shifting API 212, which includes functionality for determining which hypervisor-specific commands need to be called in order to carry out the convert operation, and then calling the hypervisor-specific commands through proprietary APIs (e.g., APIs exposed by the ESX Server, Hyper-V Server, or a VMWare API such as VI Java or PowerCLI). The hypervisor-specific commands may be executed by hypervisor-specific services 214.

The guest OS 206 may be presented a virtual disk by the virtual machines 106, where the virtual disk is an abstraction of the physical storage used by the virtual machines 106. A file system in a data storage 112 may store a source VM virtual disk, where the source VM virtual disk is an arrangement of blocks corresponding to a virtual disk format used by the source hypervisor. The file system may further store a destination VM virtual disk, where the destination VM virtual disk is an arrangement of blocks corresponding to a virtual disk format used by the destination hypervisor. The source VM virtual disk and the destination VM virtual disk may be built from almost entirely the same set of blocks, with the common blocks being those that correspond to the storage of data visible to the guest OS 206.

Each of the source VM virtual disk and the destination VM virtual disk may have one or more blocks dedicated to storage of data and metadata used by the source hypervisor and destination hypervisor, respectively, that is not accessible to the guest OS 206. For example, one block may be exclusively used by the source hypervisor for storing data and metadata used for managing its access to the common blocks.

Because of the above-noted overlap in storage blocks, transitioning from the source hypervisor to the destination hypervisor may involve simply creating a new block, with data and metadata for managing the common blocks, and constructing a destination VM virtual disk from those blocks used by source VM virtual disk that are not exclusive to the management data and metadata of source hypervisor.

Prior to migration, the data for the VMs may be stored in an ONTAP data format in a data storage 112 embodied as an ONTAP storage cluster. Although ONTAP allows the underlying VM data to be exposed in different ways (e.g., using different storage location formats) depending on the type of VM 106 associated with the data, ONTAP maintains a common representation that can be used to quickly convert the data from one VM 106 to another (e.g., in constant time, typically requiring minutes at most). Other types of data storage devices and formats may also be used in conjunction with exemplary embodiments, such as the NetApp E-Series and EMC array.

A migration application 216 may interact with the source hypervisor, the destination hypervisor, the guest OS 206, and the data storage 112 to migrate the guest OS 206 running on the source VM from the source hypervisor to the destination hypervisor. The migration application 216 may generate one or more scripts that run in the guest OS 206 running on top of each of the source VM and the destination VM to perform the migration. The migration application 216 may use one or more scripts that run in the guest OS on top of the source VM to gather configuration information for use in generation of one or more scripts that run in the guest OS on top of destination VM. The migration application 216 may also make use of a storage mapping 218 to manage the migration of data stored in the data storage from the source VM to the destination VM. The actions of the migration application 216 and the storage mapping 218 are described in more detail with respect to FIGS. 4 and 5, below.

The migration application 216 may send commands to and monitor the source hypervisor and destination hypervisor. For instance, the migration application 216 may script or use direct commands to initiate power cycles of the virtual machines 110 and use the power cycling of virtual machines 110 to monitor the progress of scripts. By using scripts that use the built-in scripting of the guest OS 206, the migration application 216 may avoid installing software agents within the guest OS for performing the migration, thereby simplifying the migration process.

Figure 3:
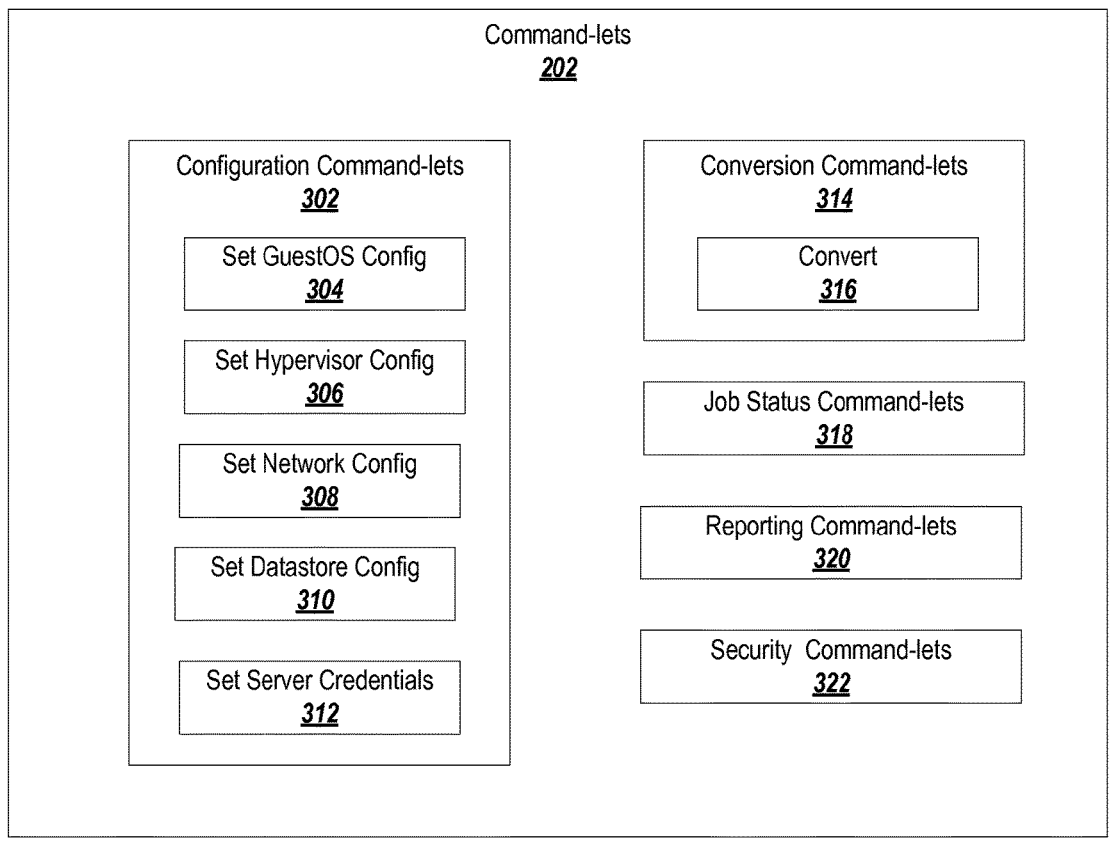
FIG. 3 depicts exemplary command-lets suitable for use with embodiments described herein.

Turning to FIG. 3, the above-described cmdlets 202 may be organized into several categories, including configuration cmdlets 302, conversion cmdlets 314, job status cmdlets 318, reporting cmdlets 320, and security cmdlets 322.

By way of example, the configuration cmdlets 302 may include a cmdlet 304 for setting a GuestOS configuration, a cmdlet 306 for setting the source or destination hypervisor configuration, a cmdlet 308 for setting a network configuration, a cmdlet 310 for setting a data storage configuration, an da cmdlet 312 for setting authorization credentials at the migration server, among other possibilities. The conversion cmdlets 314 may include a dedicated convert cmdlet 316, which performs only conversion functionality and does not implement other functionality, such as (e.g.) configuration functionality.

Thus, as shown in FIG. 3, the configuration functionality and the conversion functionality may be maintained separately (e.g., the configuration cmdlets 302 do not perform conversion, and the conversion cmdlets 314 do not configure the system architecture). By maintaining separation between the configuration cmdlets 302 and the conversion cmdlets 314, the conversion cmdlets 314 may be kept very simple, which facilitates use of the conversion cmdlets 314 and integration of the conversion cmdlets 314 into scripts.

Figure 4:
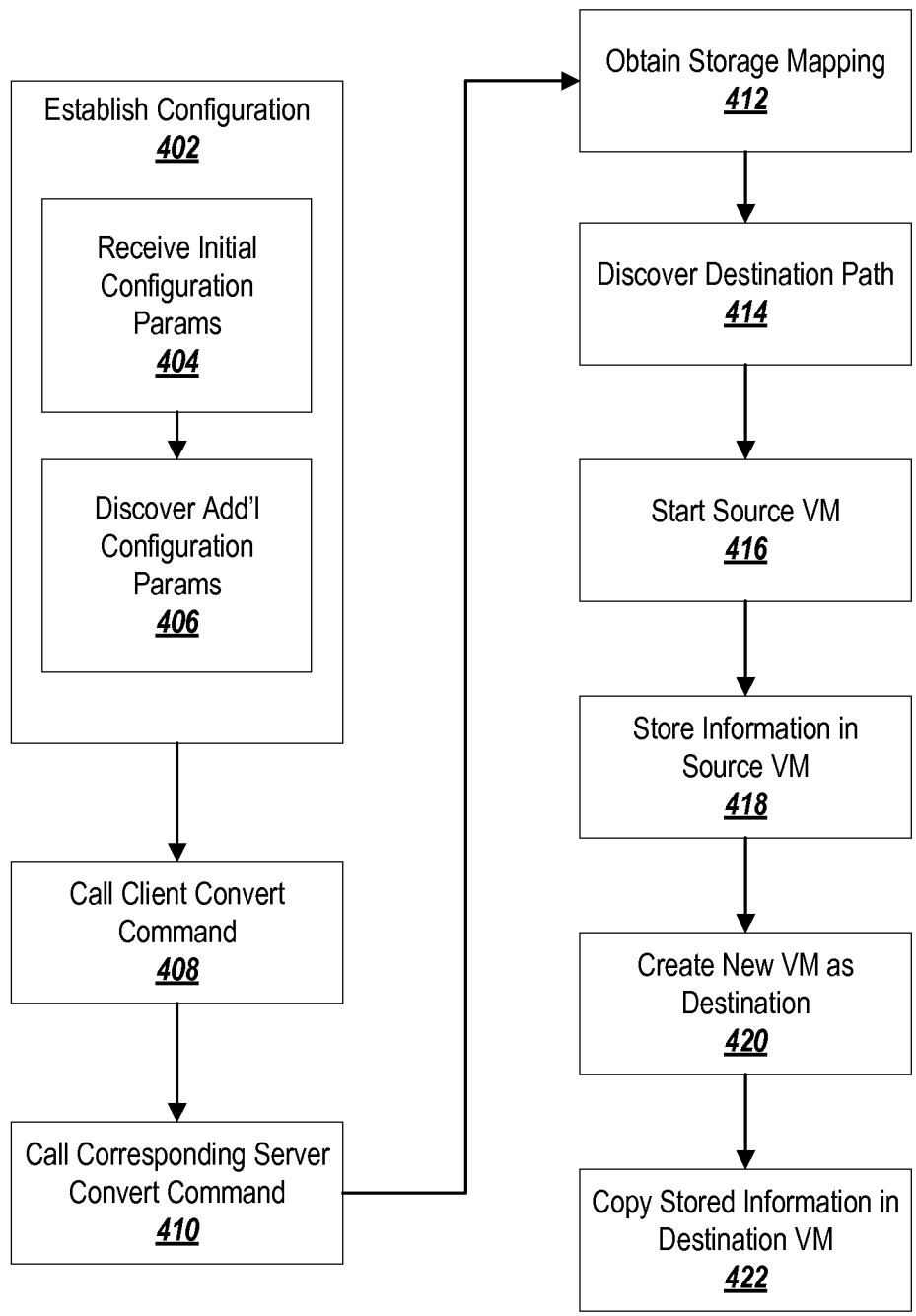
FIG. 4 depicts an exemplary method suitable for use with embodiments described herein.

In general, the procedure for migrating a VM from one hypervisor to another involves the following steps, described with reference to FIGS. 4 and 5.

At step 402, a configuration may be established. The configuration may be established using configuration cmdlets 302. The configuration may specify details of the source and destination hypervisors, VMs, guest OS, and/or storage components involved in the migration, as well as details regarding the network configuration of the source VM and destination VM.

For example, the source VM may be provided by a source hypervisor, and the destination VM may be provided by a destination hypervisor. The source hypervisor and destination hypervisor may differ in hardware virtualization so as to prevent a guest OS running on the source VM from making full use of the destination VM without reconfiguration. For example, the networking configuration of the guest OS may be incompatible with the virtualized networking hardware presented to the guest OS as part of the virtualized hardware environment of the destination VM.

The configuration information collected in step 402 may include an NIC-to-MAC mapping between one or more network interfaces of the source VM and media access control addresses assigned to the one or more network interfaces of the source VM. This mapping may allow a logic flow to recreate the associations between non-virtualized, physical NICs and the virtualized NICs of the virtualized hardware environment despite changes in how the virtualized hardware environment is created.

The configuration information may also include the locations of any storage resources used by the source VM and/or the destination VM.

As part of establishing the configuration, initial configuration parameters may be received by the migration server at step 404. Some initial configuration parameters may be specified through a script, and may be provided by a user. The initial configuration parameters may include: hypervisor information (e.g., the IP address and credentials for each hypervisor's server, such as an ESX server or a HyperV server); a network mapping (e.g., ESX vSwitch A to HyperV vSwitch B; because ESX and HyperV use different virtual switches in this example, the mapping needs to be specified to carry out the migration), information for the Data ONTAP storage cluster (such as login credentials and the cluster's IP address), information about the Guest OS; and other configuration parameters.

Using the initial configuration parameters, the migration server may discover, at step 406, more detailed virtual machine and Guest OS information. For example, based on an input VM name, the migration server may query the VM to discover: the VM configuration (e.g., the number of CPUs, memory size, information about a DVD drive attached to the VM, etc.); a list of virtual disks with backend storage locations; NIC cards associated with the VM; and a disk driver mapping, among other possibilities.

The configuration may be established at step 402 via cmdlets called by a script. The cmdlets may issue commands to the migration server using API commands, and the API commands may have a one-to-one correspondence to the cmdlets.

At step 408, a "convert" command may be called at the client (e.g., a dedicated "convert" cmdlet may be called through a script). The convert command may specify a name of a VM, as well as a direction of conversion (e.g., by specifying a source VM and a destination VM). The convert command may utilize the initial configuration parameters and the configuration information that was discovered by the migration server based on the initial configuration parameters.

The client's convert command may call, at step 410, a corresponding convert command in the migration server's interface (e.g., server interface 208). The convert command is accepted by the web server 210 and sent to the Hypervisor Shifting API 212. The Hypervisor Shifting API 212 in turn calls upon an appropriate service (e.g., first VM service 214 and a second VM service 214, which may be, for example, a Hyper-V Service or the VMWare Service, although other options are possible), depending on the direction of the conversion, in order to issue hypervisor-specific API commands to effect the migration.

At step 412, the migration server obtains a storage mapping 218 (e.g., a list of disks, storage locations, etc.) for the source and/or destination VMs. As noted above, the data may be stored in an ONTAP Data format, but may be exposed in different manners depending on the type of VM that stored the data. The storage mapping may map the VM-specific style of exposing the data for each VM to a common data storage format.

At step 414, the migration server discovers the destination path (i.e., the location of the destination disk directory at which converted data from the source VM will be stored) based on data obtained from the storage mapping. The migration server then calls the Disk Conversion Library to convert the source VM data into a format compatible with the destination VM disk type.

At this stage, the migration server has generated destination disks capable of being read by the destination VM. At step 416, the migration server now starts the source VM, and stores information (e.g., the source IP address, an authenticated user name and password, connecting switch information, etc.) in the source VM at step 418. The migration server then contacts the destination host at which the destination VM will be set up, and creates a new VM using the generated destination disks at step 420. The stored information is copied to the new VM at step 422, and the conversion process is complete.

The above-described convert command may be a dedicated command for migrating from a source VM to a destination VM. Conventionally, the process of converting a VM from one hypervisor to another involves calling multiple hypervisor-specific commands. This makes conversion complex, and typically requires that conversions are carried out manually, one-at-a-time. In contrast, by providing a simple, dedicated convert command that does not perform configuration functionality and that abstracts away many of the details of the underlying convert operations, the conversion process can be easily called through a script, can be carried out automatically, and can be used to convert multiple VMs in quick succession.

The above-described interface may be, in some embodiments, a RESTful API. RESTful APIs are specifically designed to be used in a client/server environment, and thus are particularly well-suited to the conversion architecture shown in Appendix A. RESTful APIs are expandable, simple, and scalable, which allow them to be used to easily and efficiently convert a large number of VMs. Moreover, a RESTful API can abstract away many of the details of the underlying operations performed at the server-side, which hides these details from the end user and simplifies the conversion process. In some embodiments, all that needs to be specified to the RESTful API is the source location for the VM, the destination location for the VM, and the name of the VM.

The above-described method may be embodied as instructions on a computer readable medium or as part of a computing architecture. FIG. 5 illustrates an embodiment of an exemplary computing architecture 500 suitable for implementing various embodiments as previously described. In one embodiment, the computing architecture 500 may comprise or be implemented as part of an electronic device. Examples of an electronic device may include those described with reference to FIG. 5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

The embodiments, however, are not limited to implementation by the computing architecture 500.

Figure 5:
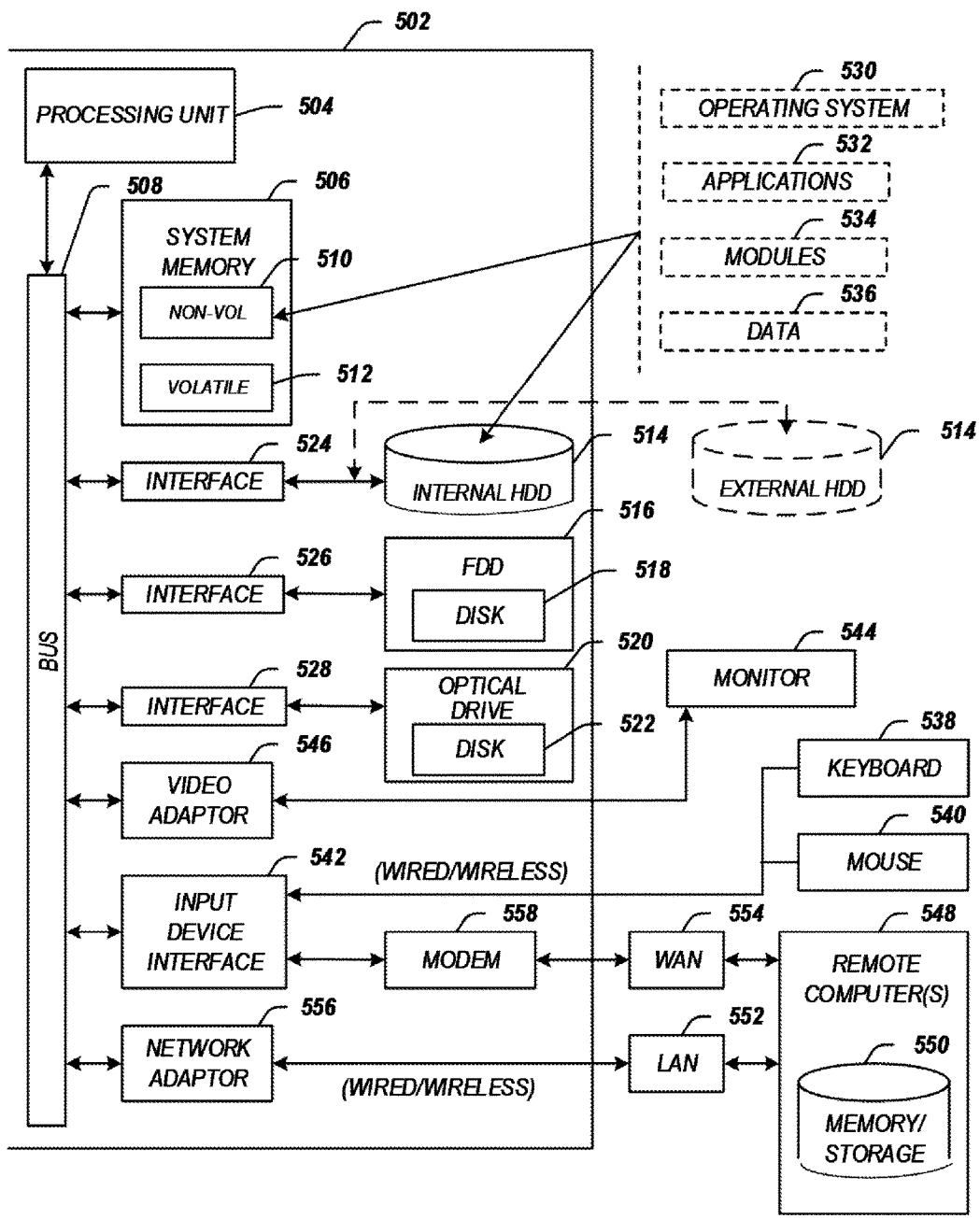
FIG. 5 depicts an exemplary computing device suitable for use with embodiments described herein.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel®

Celeron®, Core (2) Duo®, Itanium®, Pentium®, Xeon®, and XScale® processors; and similar processors. Dual microprocessors, multi-core processors, and other multi-processor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 200.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 694 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 6:
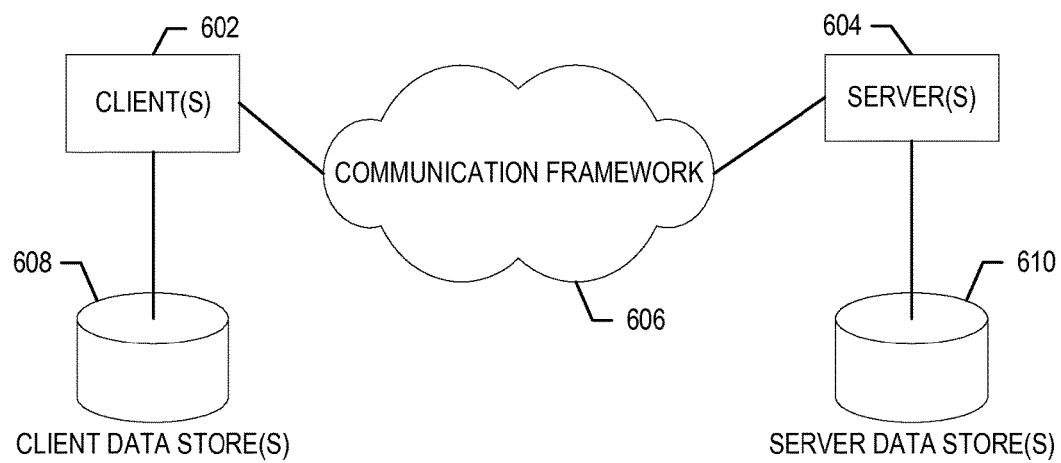
FIG. 6 depicts an exemplary network configuration suitable for use with embodiments described herein.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 comprises includes one or more clients 602 and servers 604. The clients 602 may implement the client device 102 shown in FIG. 1. The servers 604 may implement the server device 104 shown in FIG. 1. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques and protocols. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   based on a request to migrate a first virtual machine from a first hypervisor of a first hypervisor type to a second hypervisor of a second hypervisor type,
      executing a first set of commands via a first interface to collect configuration parameters about the first virtual machine, wherein executing the first set of commands at least causes execution of a first script within a guest operating system of the first virtual machine to determine at least a first configuration parameter of the configuration parameters;
      querying the first virtual machine with the first configuration parameter to obtain additional configuration parameters which relate to virtual hardware of the first virtual machine; and
      executing a second set of one or more commands defined by a second interface to configure a second virtual machine on the second hypervisor based, at least in part, on the configuration parameters about the first virtual machine, wherein the second interface defines the second set of commands for the second hypervisor type which is different than the first hypervisor type.

2. The method of claim 1 further comprising:
   determining network parameters of the first virtual machine based, at least in part, on the execution of the first set of commands, wherein the network parameters indicate at least a mapping between a network interface and a media access control address of the first virtual machine; and
   recreating the network parameters in the second hypervisor for the second virtual machine.

3. The method of claim 2, wherein recreating the network parameters in the second hypervisor for the second virtual machine comprises:
   determining that the first hypervisor utilizes physical network interfaces and the second hypervisor utilizes virtual network interfaces;
   creating a virtualized network interface on the second hypervisor to emulate the network interface of the first virtual machine;
   mapping the virtualized network interface to a media access control address similar to the media access control address of the first virtual machine; and
   associating the second virtual machine with the mapped virtual network interface.

4. The method of claim 1 further comprising:
   migrating the guest operating system from the first virtual machine to the second virtual machine; and
   executing a second script on the migrated guest operating system to modify a configuration parameter of the migrated guest operating system for compatibility with the second virtual machine.

5. The method of claim 1 further comprising:
   determining a first storage location for a virtual machine disk image of the first virtual machine based, at least in part, on the execution of the first set of commands;
   storing configuration information to be used by the second hypervisor in the virtual machine disk image;
   determining a second storage location for the virtual machine disk image to be stored for access by the second hypervisor; and
   copying the virtual machine disk image from the first storage location to the second storage location.

6. The method of claim 5 further comprising:
   converting the virtual machine disk image of the first virtual machine from a first type of virtual machine disk image compatible with the first hypervisor type to a common data format; and
   converting the virtual machine disk image from the common data format to a second type of virtual machine disk image compatible with the second hypervisor.

7. The method of claim 1, wherein executing the first set of commands via the first interface comprises identifying the first interface based, at least in part, on the first hypervisor type, wherein the first interface is an application programming interface for the first hypervisor.

8. One or more non-transitory machine-readable media comprising program code for migrating a virtual machine the program code to:
   based on a request to migrate a first virtual machine from a first hypervisor of a first hypervisor type to a second hypervisor of a second hypervisor type,
      execute a first set of commands via a first interface to collect configuration parameters about the first virtual machine, wherein the execution of the first set of commands at least causes execution of a first script within a guest operating system of the first virtual machine to determine one or more of the configuration parameters;
      use one or more of the configuration parameters to query the first virtual machine to obtain additional configuration parameters which relate to virtual hardware available to the first virtual machine; and execute a second set of one or more commands defined by a second interface to configure a second virtual machine on the second hypervisor based, at least in part, on the configuration parameters about the first virtual machine, wherein the second interface defines the second set of commands for the second hypervisor type which is different than the first hypervisor type.

9. The machine-readable media of claim 8 further comprising program code to:
   determine network parameters of the first virtual machine based, at least in part, on the execution of the first set of commands, wherein the network parameters indicate at least a mapping between a network interface and a media access control address of the first virtual machine; and
   recreate the network parameters in the second hypervisor for the second virtual machine.

10. The machine-readable media of claim 9, wherein the program code to recreate the network parameters in the second hypervisor for the second virtual machine comprises:
   determine that the first hypervisor utilizes physical network interfaces and that the second hypervisor utilizes virtual network interfaces;
   create a virtualized network interface on the second hypervisor to emulate the network interface of the first virtual machine;
   map the virtualized network interface to a media access control address similar to the media access control address of the first virtual machine; and
   associate the second virtual machine with the mapped virtual network interface.

11. The machine-readable media of claim 8 further comprising program code to:
   migrate the guest operating system from the first virtual machine to the second virtual machine; and
   execute a second script on the migrated guest operating system to modify a configuration parameter of the migrated guest operating system for compatibility with the second virtual machine.

12. The machine-readable media of claim 8 further comprising program code to:
   determine a first storage location for a virtual machine disk image of the first virtual machine based, at least in part, on the execution of the first set of commands;
   store configuration information to be used by the second hypervisor in the virtual machine disk image;
   determine a second storage location for the virtual machine disk image to be stored for access by the second hypervisor; and
   copy the virtual machine disk image from the first storage location to the second storage location.

13. The machine-readable media of claim 12 further comprising program code to:
   convert the virtual machine disk image of the first virtual machine from a first type of virtual machine disk image compatible with the first hypervisor type to a common data format; and
   convert the virtual machine disk image from the common data format to a second type of virtual machine disk image compatible with the second hypervisor.

14. An apparatus comprising:
   a processor; and
   a machine-readable medium having program code executable by the processor to cause the apparatus to,
   based on a request to migrate a first virtual machine from a first hypervisor of a first hypervisor type to a second hypervisor of a second hypervisor type,
      execute a first set of commands via a first interface to collect configuration parameters about the first virtual machine, wherein the execution of the first set of commands at least causes execution of a first script within a guest operating system of the first virtual machine to determine one or more of the configuration parameters;
      use one or more of the configuration parameters to query the first virtual machine to obtain additional configuration parameters which relate to virtual hardware available to the first virtual machine; and
      execute a second set of one or more commands defined by a second interface to configure a second virtual machine on the second hypervisor based, at least in part, on the configuration parameters about the first virtual machine, wherein the second interface defines the second set of commands for the second hypervisor type which is different than the first hypervisor type.

15. The apparatus of claim 14, further comprising to program code executable by the processor to cause the apparatus to:
   determine network parameters of the first virtual machine based, at least in part, on the execution of the first set of commands, wherein the network parameters indicate at least a mapping between a network interface and a media access control address of the first virtual machine; and
   recreate the network parameters in the second hypervisor for the second virtual machine.

16. The apparatus of claim 15, wherein the program code executable by the processor to cause the apparatus to recreate the network parameters in the second hypervisor for the second virtual machine comprises program code executable by the processor to cause the apparatus to:
   determine that the first hypervisor utilizes physical network interfaces and that the second hypervisor utilizes virtual network interfaces;
   create a virtualized network interface on the second hypervisor to emulate the network interface of the first virtual machine;
   map the virtualized network interface to a media access control address similar to the media access control address of the first virtual machine; and
   associate the second virtual machine with the mapped virtual network interface.

17. The apparatus of claim 14 further comprising program code executable by the processor to cause the apparatus to:
   migrate the guest operating system from the first virtual machine to the second virtual machine; and
   execute a second script on the migrated guest operating system to modify a configuration parameter of the migrated guest operating system for compatibility with the second virtual machine.

18. The apparatus of claim 14 further comprising program code executable by the processor to cause the apparatus to:
   determine a first storage location for a virtual machine disk image of the first virtual machine based, at least in part, on the execution of the first set of commands;
   store configuration information to be used by the second hypervisor in the virtual machine disk image;
   determine a second storage location for the virtual machine disk image to be stored for access by the second hypervisor; and copy the virtual machine disk image from the first storage location to the second storage location.

19. The apparatus of claim 18 further comprising program code executable by the processor to cause the apparatus to:
convert the virtual machine disk image of the first virtual machine from a first type of virtual machine disk image compatible with the first hypervisor type to a common data format; and
convert the virtual machine disk image from the common data format to a second type of virtual machine disk image compatible with the second hypervisor.

20. The apparatus of claim 14, wherein the program code executable by the processor to cause the apparatus to execute the first set of commands via the first interface comprises program code executable by the processor to cause the apparatus to identify the first interface based, at least in part, on the first hypervisor type, wherein the first interface is an application programming interface for the first hypervisor.

* * * * *